US009213190B2

(12) United States Patent
Trail et al.

(10) Patent No.: US 9,213,190 B2
(45) Date of Patent: Dec. 15, 2015

(54) SPARSE APERTURE OPTICAL ALIGNMENT AND RELATED METHODS

(71) Applicant: RAYTHEON COMPANY, Waltham, MA (US)

(72) Inventors: Nicholas D. Trail, Tucson, AZ (US); David J. Markason, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 121 days.

(21) Appl. No.: 13/756,746

(22) Filed: Feb. 1, 2013

(65) Prior Publication Data

US 2014/0218749 A1 Aug. 7, 2014

(51) Int. Cl.
| | |
|---|---|
| *G01B 11/02* | (2006.01) |
| *G02B 27/62* | (2006.01) |
| *G02B 23/06* | (2006.01) |
| *G02B 5/09* | (2006.01) |
| *G02B 5/10* | (2006.01) |
| *G01M 11/00* | (2006.01) |

(52) U.S. Cl.
CPC ............. *G02B 27/62* (2013.01); *G01M 11/005* (2013.01); *G02B 5/09* (2013.01); *G02B 5/10* (2013.01); *G02B 23/06* (2013.01)

(58) Field of Classification Search
CPC ............ G02B 27/62; G02B 5/09; G02B 5/10; G02B 23/06; G01M 11/005
USPC ........................................................ 356/510
See application file for complete search history.

(56) References Cited

U.S. PATENT DOCUMENTS

| | | | |
|---|---|---|---|
| 5,291,333 A | 3/1994 | Mills et al. | |
| 6,493,093 B2* | 12/2002 | Harasaki et al. | 356/497 |
| 7,764,385 B1 | 7/2010 | Dey | |
| 8,456,644 B2* | 6/2013 | Evans et al. | 356/513 |
| 2010/0053634 A1 | 3/2010 | Lyon | |
| 2011/0157600 A1 | 6/2011 | Lyon | |

OTHER PUBLICATIONS

Phasing the mirror segments of the keck telescopes: the broadband phasing algorithm, Applied Optics, vol. 37, No. 1, Jan. 1998, pp. 140-155.*
Design of the Keck Observatory Alignment Camera, SPIE vol. 1036 Precision Instrument Design, 1988, pp. 59-69.*

* cited by examiner

*Primary Examiner* — Tarifur Chowdhury
*Assistant Examiner* — Jonathon Cook
(74) *Attorney, Agent, or Firm* — Lando & Anastasi, LLP

(57) ABSTRACT

A method for configuring an alignment of a plurality of optical segments in a sparse aperture configuration of an optical device includes providing at least one beam of light from at least one light source located on the sparse aperture optical device, directing the at least one beam of light toward at least one segment of the plurality of optical segments, detecting a reflection or transmission of the at least one beam of light off of the at least one segment of the plurality of optical segments, determining a characteristic of the reflected or transmitted light, and based on the characteristic of the reflected or transmitted light, determining an alignment of the at least one segment of the plurality of optical segments.

15 Claims, 14 Drawing Sheets

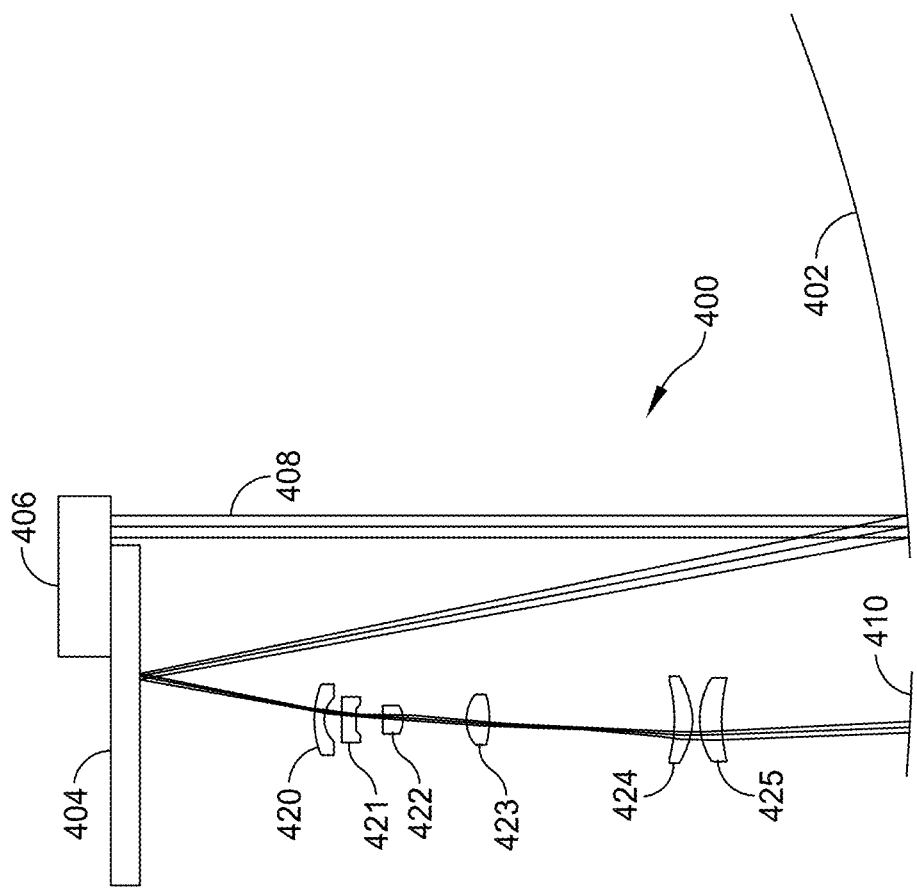

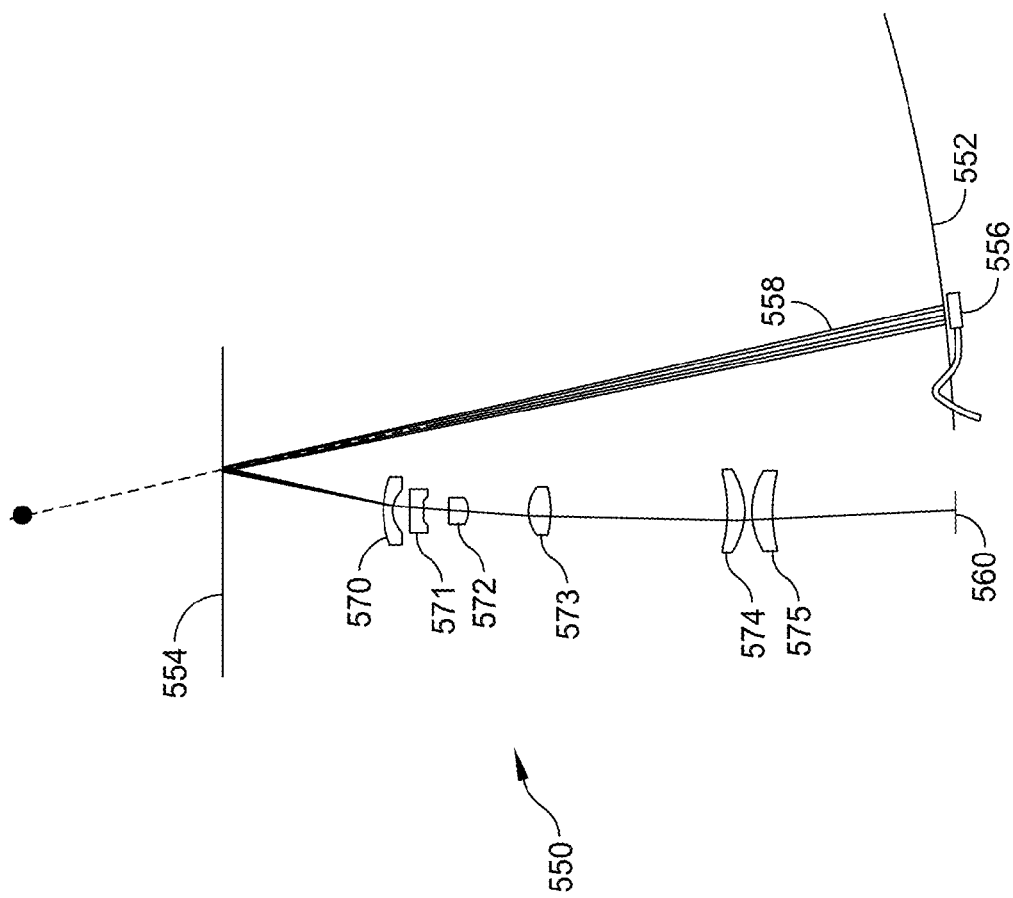

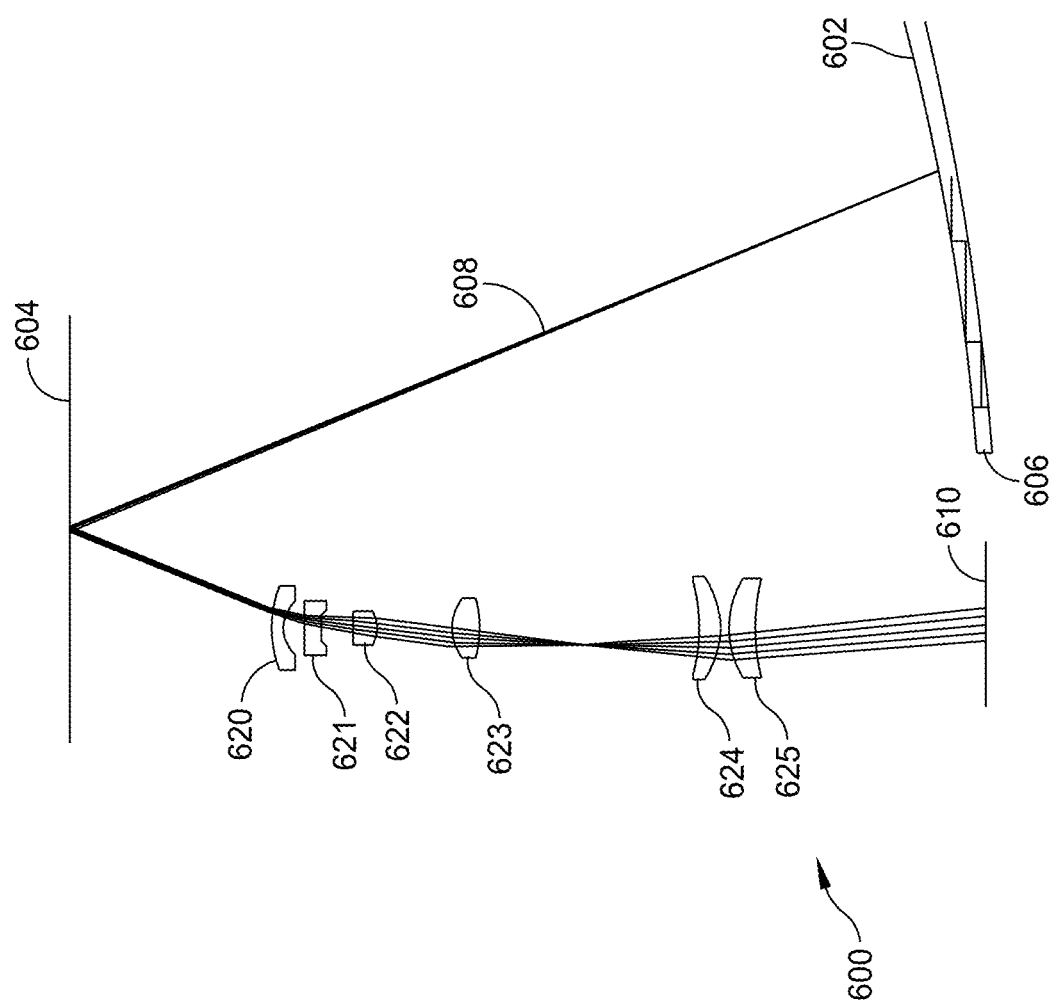

SPARSE APERTURE OPTICAL ALIGNMENT AND RELATED METHODS

BACKGROUND

This disclosure relates to mechanisms and methods for precision alignment of segmented mirrors of an optical system, during both initial calibration and during use.

Some optical systems are designed to be physically smaller for storage or delivery than in use, to minimize the system's logistical footprint while maximizing the system performance. To achieve more compact configurations, optical elements (such as mirrors) may be physically moved closer to each other for storage than in use. In the storage position, the elements do not need to be held with optical precision, instead the elements are placed for minimum volume and safekeeping. During use, the elements would be deployed to the final precise configuration of the telescope and retained therein, or allow multiple movements between storage and use configurations, or both.

Some optical systems are designed to be delivered in a compact, stowed configuration, and expanded to an operational configuration. The accuracy required for the positioning between components for optical performance is on the order of a thousandth of an inch. If a single optical component, such as a primary mirror, is composed of multiple physical segments (referred to as child members), the accuracy of positioning relative to one another required is on the order of a millionth of an inch.

SUMMARY OF INVENTION

One aspect of the disclosure is directed to a method for configuring alignment for segments of an optical device. In one embodiment, a method for configuring an alignment of a plurality of optical segments in a sparse aperture configuration of an optical device includes providing at least one beam of light from at least one light source located on the sparse aperture optical device, directing the at least one beam of light toward at least one segment of the plurality of optical segments, detecting a reflection or transmission of the at least one beam of light off of the at least one segment of the plurality of optical segments, determining a characteristic of the reflected or transmitted light, and based on the characteristic of the reflected or transmitted light, determining an alignment of the at least one segment of the plurality of optical segments.

In some embodiments, the method further includes adjusting a position of the at least one segment of the plurality of optical segments, determining a change in the characteristic of the reflected light, and based on the change in the characteristic of the reflected light, determining whether the alignment of the at least one segment of the plurality of optical segments matches a predetermined alignment.

In some embodiments, configuring an alignment of a plurality of optical segments in a sparse aperture configuration of an optical device includes configuring an alignment of a plurality of optical segments of a reflective optical element.

In some embodiments, configuring an alignment of a plurality of optical segments in a sparse aperture configuration of an optical device includes configuring an alignment of a plurality of optical segments of a refractive optical element.

In some embodiments, the method further includes repeating each of the steps for each of the plurality of optical segments.

In some embodiments, the at least one beam of light comprises a first beam of light and a second beam of light, and directing the at least one beam of light includes directing the first beam of light at a first point on a first segment of the plurality of optical segments and directing the second beam of light at a second point on the first segment of the plurality of optical segments.

In some embodiments, determining a characteristic of the reflected light includes determining a spot and position of each of the reflected first and second beams of light. In some embodiments, the method further includes comparing the measured imaged spot size and position of the reflected first and second beams of light with respective predetermined reference measurements.

In some embodiments, directing the at least one beam of light includes directing a first beam of light at a spot such that the first beam of light illuminates a first optical segment and a second optical segment simultaneously, the first and second optical segments being adjacent to each other. In some embodiments, determining a characteristic of the reflected light includes determining image position and interference patterns of the reflected light. In some embodiments, the method further includes determining a position of a centroid of the interference patterns. In some embodiments, the method further includes determining a focus of a centroid of the interference patterns. In some embodiments, the method further includes adjusting a position of the second optical segment, determining a change in the position and/or interference patterns of the reflected light, and based on the change in the position and/or interference patterns of the reflected light, determining whether the alignment of the second optical segments matches a predetermined alignment. The method can further include providing a second and third beam of light from a second and third light source, directing the second and third beam of light at a first and second point on one of the first or second optical segments, detecting reflections of the second and third beams of light, determining characteristics of the reflected second and third beams of light, and based on the characteristics of the reflected second and third beams of light, determining whether the alignment of the first and second segments of the plurality of optical segments matches a predetermined alignment.

In some embodiments, the first and second light sources are the same light source.

In some embodiments, the at least one light source includes a light emitting diode.

In some embodiments, the at least one light source includes a laser.

In some embodiments, the at least one light source includes a light source located behind a second optical element with appropriate optics to fold the beam into the optical system pupil.

In some embodiments, the at least one light source includes at least one light source embedded behind and/or in at least one of the plurality of optical segments.

Aspects also include a sparse optical system including an optical element comprising a plurality of optical segments in a sparse aperture configuration, one or more active optical sources located on the sparse aperture optical system and configured to provide at least one beam of light directed at least one segment of the plurality of optical segments, a detector configured to receive a refraction or reflection of the at least one beam of light from at least one of the plurality of optical elements, and a processor. The processor is configured to determine a characteristic of the reflected light from at least one of the plurality of optical elements, and based on the characteristic of the recorded light pattern, determine an alignment of one segment of the plurality of optical segments to another segment of the plurality of optical elements.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 4 is a representation of portions of an optical device;
FIG. 5B is a representation of portions of an optical device;
FIG. 6 is a representation of portions of an optical device.

DETAILED DESCRIPTION

Figure 1:
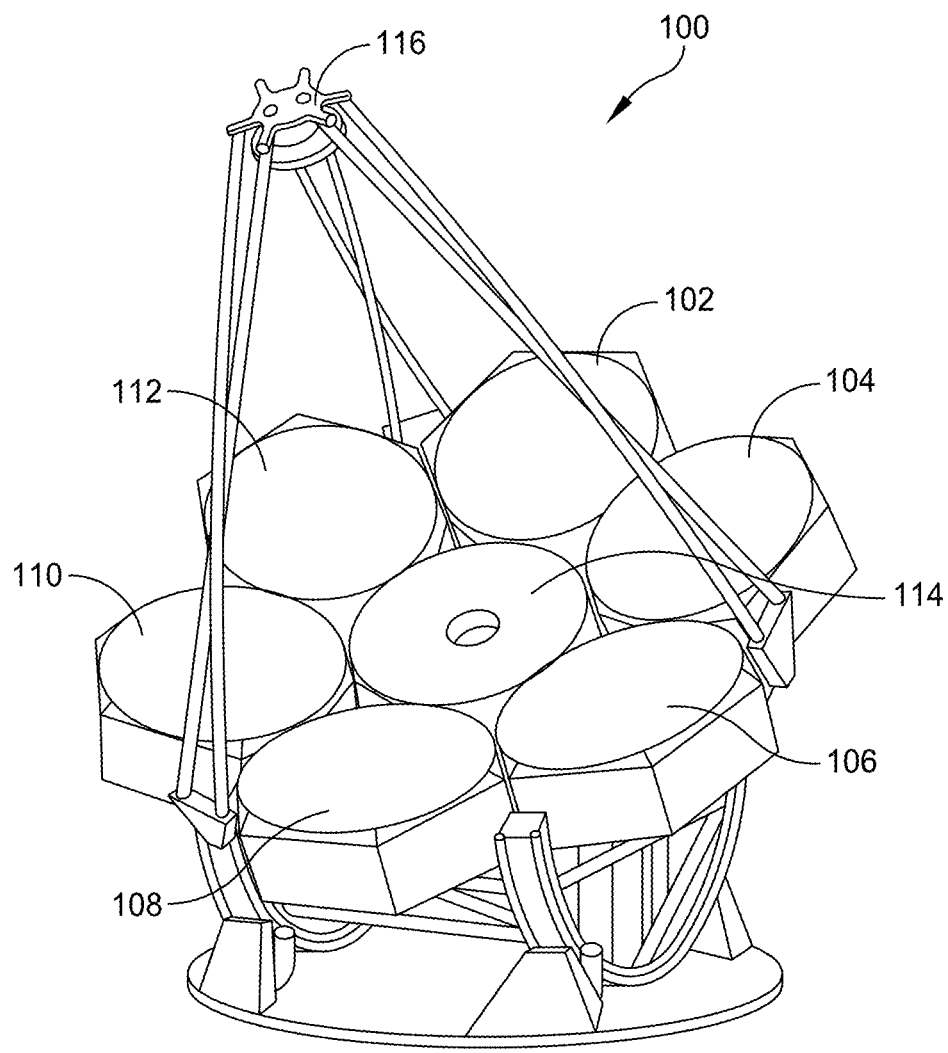
FIG. 1 is a perspective view of a portion of an optical device of an embodiment of the present disclosure.

Aspects and embodiments are directed to systems and methods for configuring an alignment of optical segments of an optical device. For example, the optical device can be any optical device including optical segments that move or fold. For example, the optical device can be a telescope, such as a telescope with a sparse aperture configuration, where the entrance pupil of the telescope is partially blocked or omitted due to breaks in the physical architecture or optical elements. The telescope can have a primary mirror, a secondary mirror, and/or various refractive optical elements (referred to as reflective, refractive and catadioptric systems). In one implementation, the primary mirror can be made up of multiple smaller mirror segments, referred to as child members, which mimic the optical figure of that parent surface when in alignment. The mirror segments can be moveable, allowing the primary mirror to be folded into a smaller area. For example, the primary mirror can be folded up during transport of the telescope, or through deployment of a space-bound orbiting telescope. Once deployed, according to aspects and embodiments of this disclosure, the mirror segments can be unfolded and aligned precisely relative to each other and to other optical elements of the telescope, allowing full utilization and performance of the telescope and potentially larger collection aperture in the system (versus the storage configuration footprint).

The mirror segments can be aligned using various processes according to this disclosure, such as for example, a sub-aperture procedure and an interferometer procedure. These procedures can both be used either individually or to complement each other in aligning the mirror segments. As will be described in further detail below, the sub-aperture procedure includes directing at least two beams of light at different points of each child mirror segment. The reflections of the beams of light can be detected through the optical system itself or a separate detector channel specific to this purpose, and a size and position of the reflections can be used to determine the alignment of the mirror segment. Alternatively or in addition, the interferometer procedure includes shining a beam of light at a spot location in proximity between two mirror segments so that the beam footprint hits both mirror segments simultaneously. The reflection of the beam of light from both mirror segments can be detected, similar to as described above, and relative position with interference and coherent summation of the light can be used to determine the alignment of the two segments relative to each other. Through precision knowledge or alignment and stability of the beam(s) of light, in either procedure, the relative alignment can be globally optimized to the rest of the optical system per allowed control and feedback in each child segment mechanical mount.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, an optical device 100 includes a plurality of optical segments 102, 104, 106, 108, 110, 112, 114. The optical segments 102-114 can be mirror segments of the optical device 100, which can be a telescope. The optical segments 102-114 can be aligned to simulate a functionality of a larger optical mirror element. By segmenting a larger mirror, the optical device can be folded to occupy a smaller space, such as during transport or deployment of the optical device, allowing for a lower logistical cost structure. Smaller segments of an optical mirror element can also be cheaper and/or easier to manufacture than a larger mirror that is not segmented. In some embodiments, the optical mirror segments 102-114 are arranged in a petal formation, with a central segment 114 surrounded by the other optical segments 102-112. Each optical segment 102-114 can be the same size and shape, or have different shapes and sizes. In some embodiments, the optical segments 102-114 are substantially circular in shape. However, the optical mirror segments can be other shapes and sizes. The optical segments 102-114 can be arranged so that each optical segment 102-114 are in close proximity to one or more adjacent optical segments. For example, the optical segments 102-114 can be arranged to contact and/or nearly contact each other when the optical segments 102-114 are properly unfolded and aligned. In some embodiments, space remains between some or all of the optical segments 102-114. While FIG. 1 shows seven optical segments 102-114, the optical device 100 can include any appropriate number of optical segments constituting a larger optical element. In some embodiments, the optical segments constitute a larger optical element that is a refractive (versus as shown reflective) optical element.

In some embodiments, the optical segments 102-114 are aligned to reflect light toward a secondary optical element 116. The secondary optical element 116 can be a mirror. It is also to be appreciated that the secondary optical element can be or can include an optical source, providing for a viable location of the optical beams for the alignment procedures discussed herein. The secondary optical element 116 can be a smaller mirror than at least one of the larger optical element constituted by the optical segments 102-114. In some embodiments, the secondary optical element 116 is a mirror smaller than any of the optical segments 102-114. In some embodiments, the secondary mirror may be replaced by a prime-focus detector or various refractive lenses and detector, and still provide for a viable location for the source of the optical alignment beams discussed herein.

In some embodiments, light received by or incident upon the optical segments 102-114 of the optical device 100 is reflected by the optical segments 102-114 to the secondary optical element 116. The secondary optical element 116 reflects the light toward a detector (e.g., a focal plane array), which detects the light and which is used in combination with a processor and algorithms to generate an image of one or more sources of light or one or more objects that reflected the light received by the optical device 100. For example, the optical device 100 can be a telescope in space, orbiting the earth. The telescope can receive light reflected or emitted by the earth to generate images of the earth, and the alignment approaches discussed herein provide for an on-orbit capable, in-situ feedback to maintain optical performance throughout adverse environments.

Figures 2A, 2B:
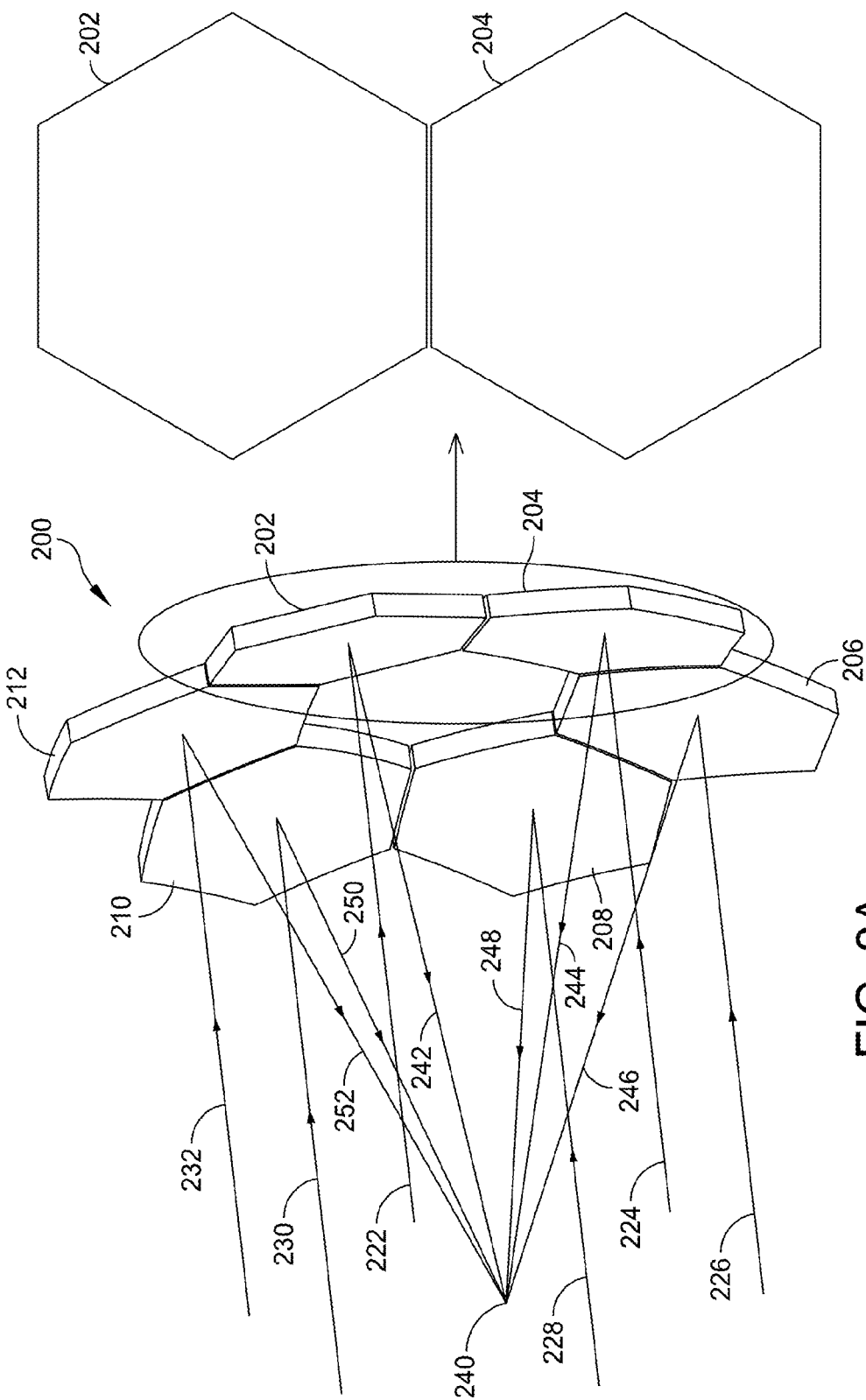
FIG. 2A is a side view representation of portions of an optical device.
FIG. 2B is a front view representation of portions of an optical device.

FIG. 2A shows an embodiment of a larger optical element 200 made up of optical segments 202, 204, 206, 208, 210, 212. In some embodiments, the optical segments 202-212 are hexagonal segments configured in a petal arrangement when unfolded. However, it is understood that the optical segments can be other shapes, sizes and arrangements so as to make up a larger mirror segment. As noted herein, the alignment of the optical segments 202-212 can affect the performance of the optical device. For example, the performance of the overall device can be affected by any of the alignment of the optical segments 202-212 relative to each other, the alignment of the optical segments 202-212 relative to other optical elements in the optical device, the alignment of the optical segments 202-212 relative to the body of the optical device, as well as a combination of any of the above.

In some embodiments, the optical segments 202-212 are aligned such that the larger optical element 200 is a concave reflective surface. However, it is understood that the optical segments can be other shapes, sizes and arrangements so as to make up another shaped larger mirror segment. The optical segments 202-212, and therefore the larger optical element 200, can reflect light beams 222, 224, 226, 228, 230, 232 received by the optical device to focus the light beams 222-232 at a focal point 240. FIG. 2B also shows an example front view of two of the optical segments 202, 204, which will be referenced in later figures in describing methods for aligning the optical segments 202-212.

Figure 3B:
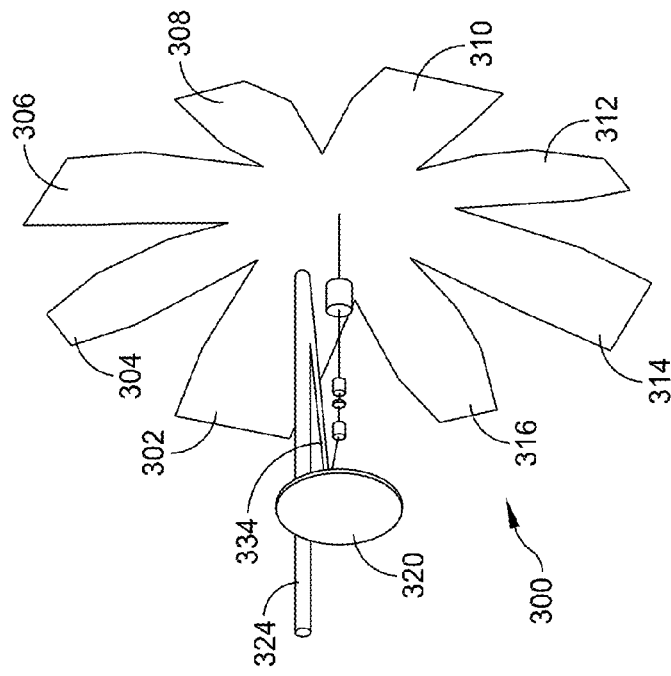
FIG. 3B is a representation of portions of an optical device.
Figure 3A:
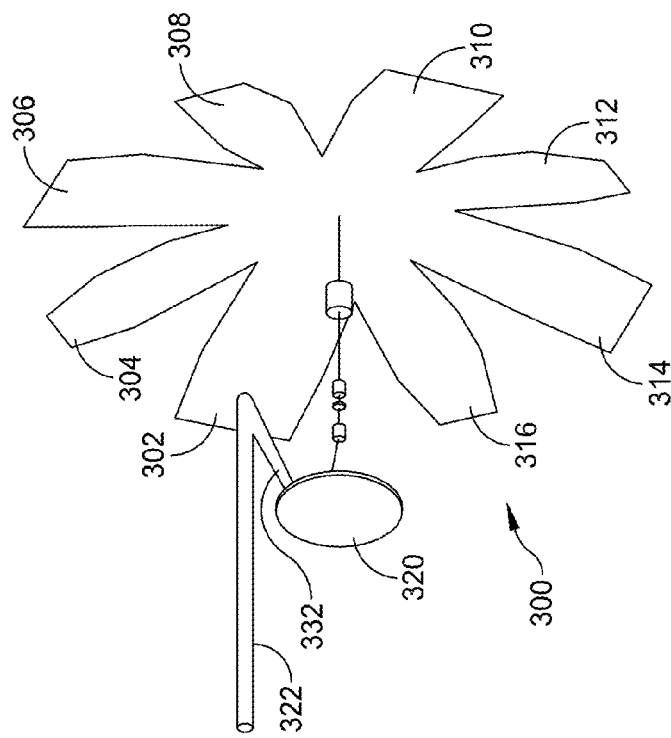
FIG. 3A is a representation of portions of an optical device.

Referring to FIGS. 3A and 3B, in some embodiments, a sub-aperture procedure can be used to align optical segments 302, 304, 306, 308, 310, 312, 314, 316 of an optical element 300. While the optical element 300 is shown as a solid component, each of the petals 302-316 such as petal 302 shown on the optical element 300 can be a separate optical mirror segment that is individually capable of moving. In some embodiments, the sub-aperture procedure includes directing two beams of light at the optical segment 302. As will be discussed herein, the two beams of light, which can be from the same or different sources at the same or different frequencies, that are located at the same or different locations, are directed at different points on the optical segment 302. For example, FIG. 3A shows a first light beam 322 directed at a point near an outer edge of the optical segment 302. FIG. 3B shows a second light beam 324 directed at a point near a central edge of the optical segment 302. The optical segment 302 reflects the incident light beams 322, 324 to a secondary optical element 320. The secondary optical element 320 reflects the light beams 322, 324 through refractive optical elements to a detector. According to aspects and embodiments of this disclosure, the locations and sizes of reflected light beams 332, 334 on the detector can be used by a processor to determine an alignment of the optical segment 302 and the other optical segments. The optical segments can be adjusted using methods described in U.S. patent application Ser. No. 13/365,399, titled "Hinge Mechanism for Small Optics and Related Methods," incorporated herein by reference in its entirety.

In some embodiments, reference measurements of the locations and sizes of the reflected light beams 332, 334 can be made using a desired alignment of the optical segment 302 and the other optical segments. The reference measurements can be stored and subsequently used as part of the process to configure the alignment of the optical segment 302 and other optical segments. For example, as the optical segment 302 is being aligned, the position and angle of the optical segment 302 can change relative to other optical segments and relative to the position of other optical elements in the optical device, including the sources of the light beams. The changes in alignment of the optical segment 302 can result in changing locations and sizes of the reflected light beams 332, 334 sensed by the detector. It is to be appreciated that this process can be an iterative process such that as the locations and sizes of the reflected light beams 332, 334 move closer to the stored reference measurements, the optical segment 302 can continue to be moved in the same direction and/or angle. Conversely, if the locations and sizes of the reflected light beams 332, 334 move away from the stored reference measurements, the alignment of the optical segment 302 can be changed in a different direction and/or angle. In some embodiments, the incident light beams 322, 324 are emitted continuously by an optical source as the optical segment 302 is moved to provide feedback so the optical segment 302 can be adjusted in the correct direction and/or angle to achieve the desired alignment of the optical segment 302. In some embodiments, the incident light beams 322, 324 are emitted intermittently. For example, a first measurement of the locations and sizes of the reflected light beams 332, 334 can be taken. The optical segment 302 can be adjusted, and then a second measurement of the locations and sizes of the reflected light beams 332, 334 can be taken. The first and second measurements can be compared to the reference measurements to determine whether the adjustment brings the optical segment 302 closer to or farther from the desired alignment measurements. This intermittent approach allows real-time mission use of the telescope (for example, monitoring some ground location on Earth while in space orbit), and subsequent alignment frames can put the telescope in alignment or provide a built-in test to preserve alignment (for example, from various environmental inputs, such as temperature changes). For example, an interlaced frame capture with control over exposure/integration time and source timing to capture and correct the system performance while data of interest is also recorded can be utilized.

In some embodiments, the locations and sizes of the reflected light beams 332, 334 can be used relative to each other to determine a desired alignment. For example, a desired alignment can result in the reflected light beams 332, 334 to overlap or have a substantially similar location and size on the detector. In some embodiments, the locations and sizes of light beams reflected from all of the optical segments can be used relative to each other to determine a desired alignment for each or any of the optical segments. For example, a point equidistant from all of the reflected light beams can be used as a reference measurement point. For example, a desired alignment can result in a weighted centroid of the reflected light beams at a center point on the detector.

In some embodiments, the locations and sizes of the reflected light beams 332, 334 relative to the reference measurements can indicate which adjustments need to be made in the alignment of the optical segment 302 or any other segment. For example, if the light beam 334 directed near the center of the optical segment 302 is farther from the reference measurement location than that of the light beam 332 directed near the edge of the optical segment 302, the desired adjustment may be a tilting of the optical segment 302 to further unfold the optical segment 302.

The beams of light can be emitted by active optical sources on the optical device. For example, the optical device can include light emitting diodes (LEDs) or lasers. The active optical sources can be positioned in various locations on the optical device.

For example, referring to FIG. 4, an active optical source 406 can be placed on a back of a secondary optical element 404. The active optical source 406 can be placed overhanging the edge of the secondary optical element 404 so that a light beam 408 can be directed at an optical segment 402. The overhanging active optical source 406 can be, for example, a collimated diode or a fiber laser. The active optical source 406 can maintain a set boresight and divergence through refractive or reflective, such as an off-axis parabola, optics. The active optical source 406 can direct the light beam 408 at the optical segment 402, which reflects the light beam 408 to the secondary optical element 404. The light beam 408 travels through various refractive optical elements 420, 421, 422, 423, 424, 425 to a detector 410. The detector 410 detects the light and a processor can use the information to adjust the alignment of the optical segment 402 as described herein.

Alternatively or additionally, the active optical sources can also be embedded on the face of the secondary optical element. Alternatively or additionally, the active optical sources can be embedded on one or more of the optical segments and/or placed on the back of one or more of the optical segments, overhanging the edge of the optical segments so that light can be reflected off of the secondary optical element back to the optical segments being aligned. Alternatively or additionally, the active optical sources can be mounted on other optical elements or the body of the optical device, for example, behind the optical segments, which may allow partial light transmission through the utilized optical surface to reflect or refract off the optical segments being aligned.

Figure 5A:
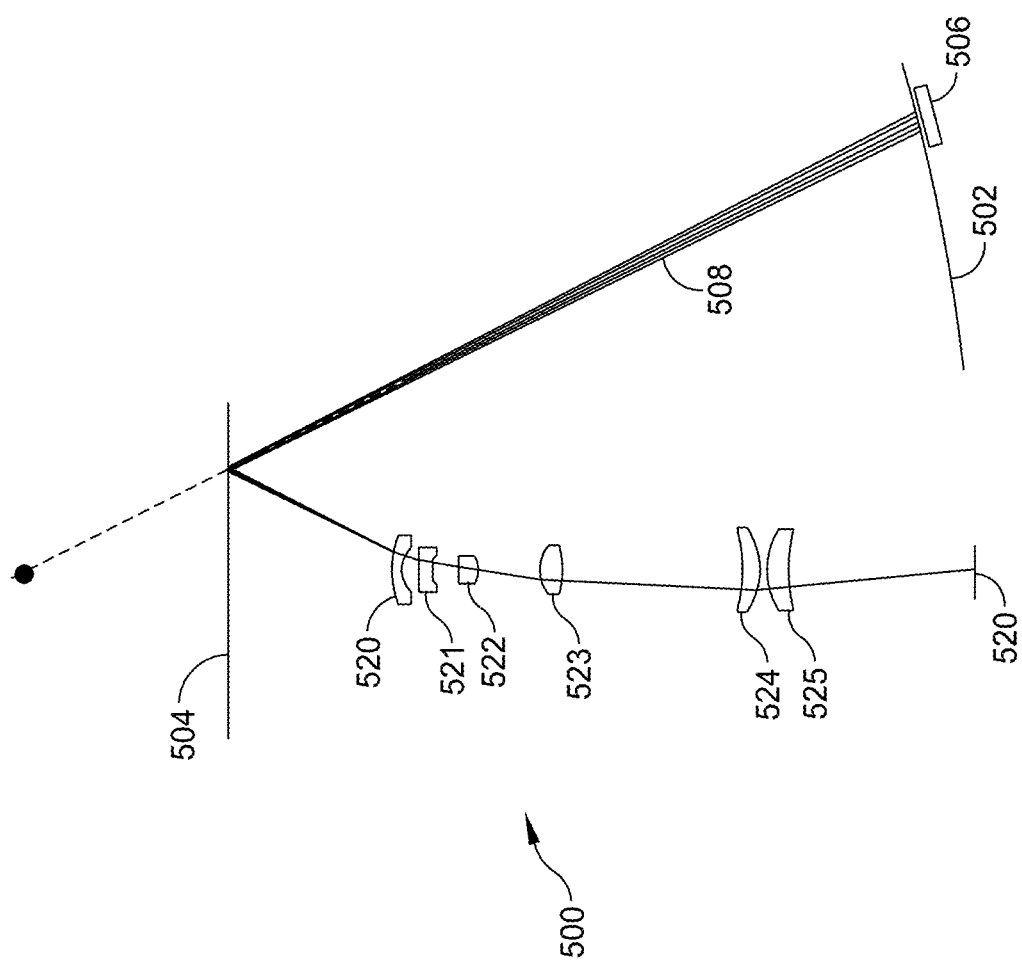
FIG. 5A is a representation of portions of an optical device.

For example, referring to FIG. 5A, an active optical source 506 can be embedded in an optical segment 502. The active optical source 506 can direct a light beam 508 at the radius of curvature virtual image of the child member and reflect off of a secondary optical element 504, which then refracts through various refractive optical elements 520-525 to a detector 510. Referring also to FIG. 5B, an active optical source 556 can be embedded in an optical segment 552 in a different location than the active optical source 506 of FIG. 5A. Either a direct or remote fiber-coupled source are viable options in embedding into the optical segment 502. The active optical source 556 can, similar to FIG. 5A, direct a light beam 558 at a common focal point behind a secondary optical element 554, which reflects the light through various refractive optical elements 570-575 to a detector 560. In some embodiments, both active optical sources 506, 556 can be embedded in each optical segment 552.

FIG. 6 shows another example embodiment, with an active optical source 606 that is coupled to an edge of an optical segment 602. The optical segment 602 can act as a waveguide and medium for the light to travel through to a given volume or shape of the optical segment. For instance, a fiber waveguide can be sandwiched in the optical segment 602 to guide light down the surface of the optical segment 602, which can be potentially thin and remote. Alternatively or additionally, the material of the optical segment 602 can be designed to function as a light-pipe or other waveguide through control of index and total-internal reflection geometry for an active optical source 606. With an engineered perturbation at a given surface location of the optical segment (e.g., an internal bump or slight change in index in the segment at a predetermined location or region), the surface location of the optical segment 602 can create an emission point for the active optical source 606, to allow a portion or all of the optical source 606 light to escape at the surface location. The active optical source 606 can then create a light beam 608 at the emission point, which can reflect off of the secondary optical element 604 and refract through various refractive optical elements 620-625 to a detector 610. In some embodiments, multiple locations are used for mounting active optical sources and/or multiple emission regions are feasible on any child segment. For example, the various elements in the embodiments described above can be used in combination for the various active optical sources. Also in some embodiments, the emission regions can act as point sources for the light out of the waveguide or have micro optics provide for a virtual or real focus position of the guided light.

In some embodiments, the optical sources can be collimated. In some embodiments, the optical sources can be focused at conjugate optical reference positions, such as prime focus position (virtual location). In some embodiments, the optical sources are free-space optical sources. In some embodiments, the optical sources are fiber-coupled. In some embodiments, there are two optical sources for each optical segment to be aligned. In some embodiments, one or more optical sources are used for more than one optical segment. In some embodiments, the optical sources can be adjustable to change the focus of the sources, directing the optical sources at different optical segments, and/or changing a spot size on the optical segments. In some embodiments, the optical sources can be moveable, such as folding behind the secondary optical element while not in use.

In some embodiments, the optical sources direct light at more than one optical segment simultaneously. The detector then receives multiple reflected beams of light, and a correction algorithm can be used to adjust the alignment of more than one optical segment simultaneously. For example, if a known bias angle is input to the optical sources and/or child member mirrors, then having all the sources on would be feasible by putting the images spots at different locations on the detector, thereby allowing a faster alignment acquisition process for real-time capture of multiple mirrors. The optical segments can be adjusted by folding or unfolding one optical segment relative to the other optical segments. The optical segments can also be adjusted by tilting all the optical segments relative to the body of the optical device. The optical segments can also be adjusted by moving all the optical segments along a longitudinal axis of the body of the optical device. In some embodiments, a third beam of light can be directed at a third point on each optical segment to provide additional feedback information.

As the active optical sources can be included on the optical device, the alignment of the optical segments can be configured while the optical device is being operated. With such an arrangement, the alignment can be configured without relying on remote optical sources, and the optical device can remain tracking a target of interest. Further, the active optical sources can be turned on in between frames of interest, allowing the optical device to continue imaging the target of interest without any interference from the alignment optical sources. This approach can be referred to as a super-frame, where the telescope can capture data on the target of interest, while also allowing real-time alignment optimization. For example, the telescope may capture nominally sixty (60) hertz imagery of the target of interest at an exposure time of 2 milliseconds, and then allow sixty (60) hertz of alignment data interlaced, with an exposure time of 2 microseconds to minimize background clutter and ensure a high signal-to-noise ratio for the alignment optical sources. This approach will also allow real-time alignment of the optical device while imaging a high-clutter or variable feature object (for example, a general Earth scene) or while imaging remote targets such as star clusters.

Figure 7:
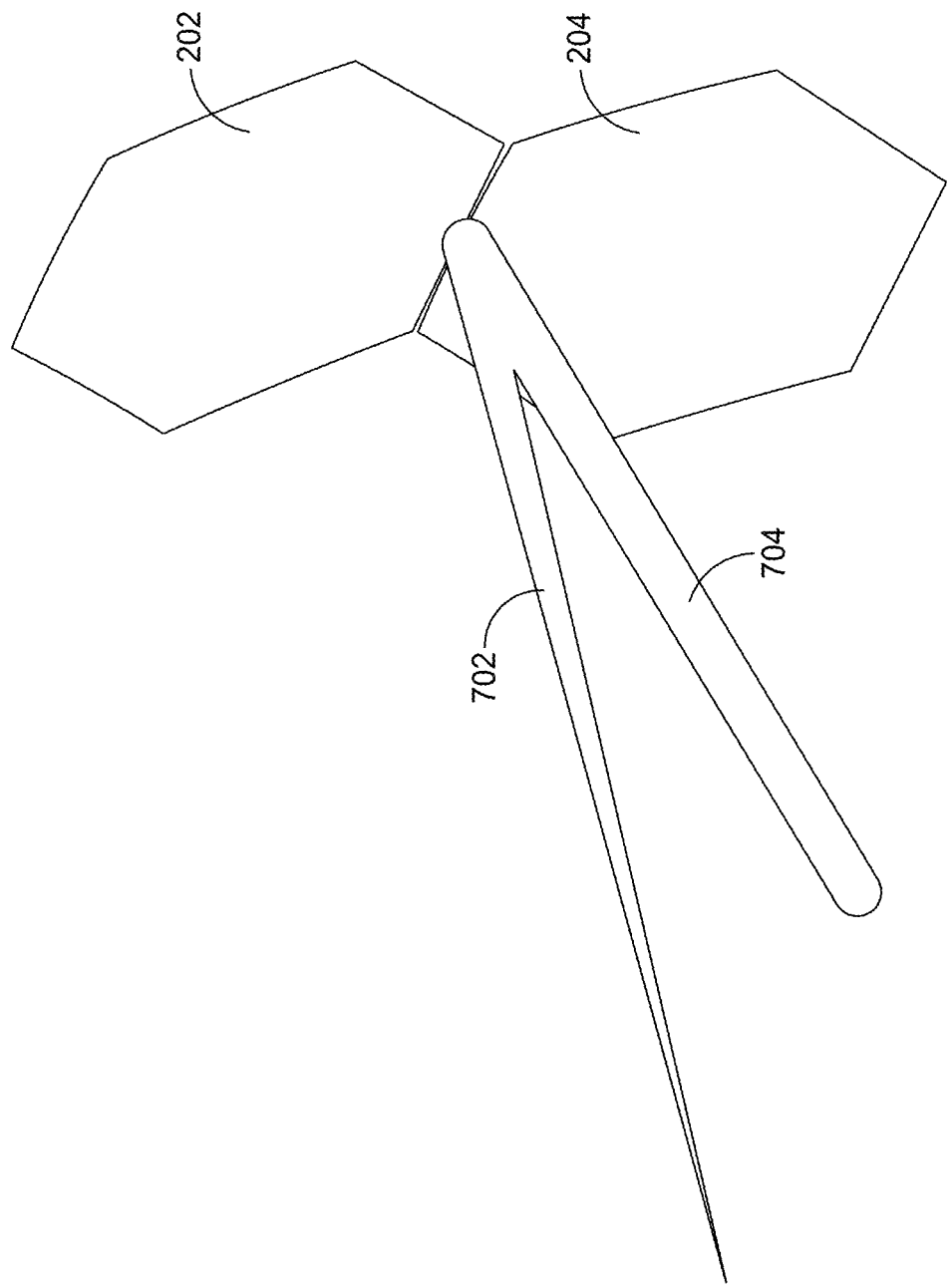
FIG. 7 is a representation of portions of an optical device.

Referring to FIG. 7, an interferometer procedure can be used to configure alignment of optical segments 202, 204. In some embodiments, the interferometer procedure includes directing a light beam 704 to be incident on two optical segments 202, 204. The light beam 704 is reflected as two separate reflected beams 702 off of the two optical segments 202, 204 toward a secondary optical element (not illustrated). As has been described herein with respect to other embodiments, the secondary optical element reflects the reflected light beams 702 to a detector, which senses the reflected light. In one embodiment, the light beam 704 is a beam collimated from an active optical source with a broadband (e.g., 10-200 nanometer, variable or static, bandwidth) spectrum. However, other optical sources with a narrower optical spectrum (1-10 nanometers, for example) and with or without a collimating device can also be used. As with the sub-aperture procedure described above, the optical device can include the active optical source.

In some embodiments, the reflected light beams 702 can be analyzed using white-light interferometry techniques. For example, the first optical segment 202 can act as a reference surface and the second optical segment 204 can act as a test surface. As the light beam 704 is reflected off of both optical segments 202, 204, the resulting reflected light beams 702 are a linear and coherent combination of the reflected wavefront from both optical segments 202, 204. The detector can be used to generate an image of the reflected light beams 702, which provides information regarding the alignment of the optical segments 202, 204. Also, the light beams utilized for alignment are generally operating at a much larger F number that the nominal telescope capability, which would increase the resultant spot diameters in the image or detector plane, providing for enough sampling area to distinguish changes in both the position and geometry of the irradiance pattern.

Figure 8A:
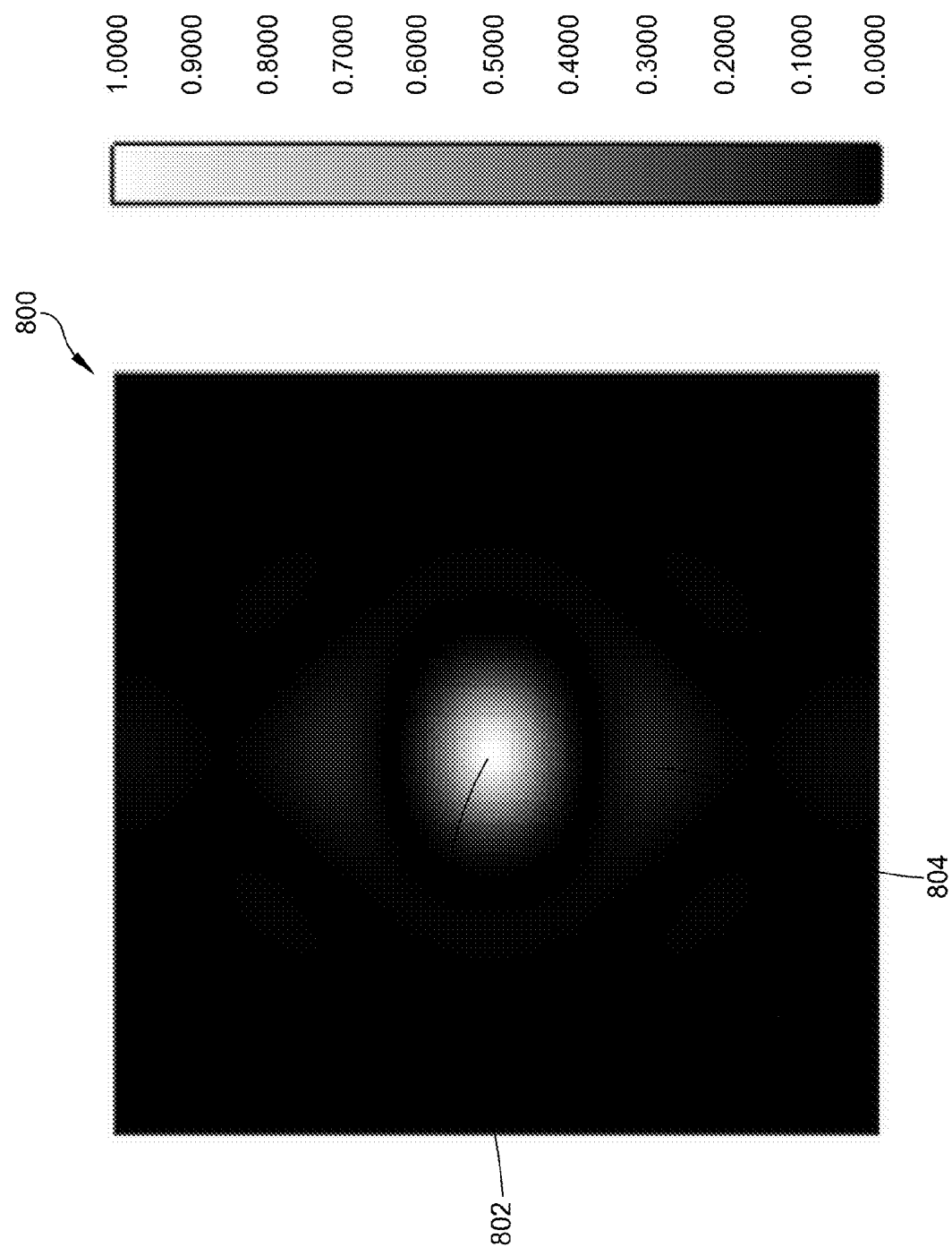
FIGS. 8A-8D are example image pattern outputs of an optical device.

For example, FIG. 8A shows an example image pattern 800 generated by a light beam reflected by two optical segments that are aligned as desired. A location of a center 802 of the pattern 800 can provide information related to a tip and/or a tilt of the optical segments. A fringe 804 around the center 802 can provide information related to an offset of the optical segments with respect to the longitudinal axis of the optical device. Thus, in some embodiments, such detection patterns can be obtained by a process and/or used by an algorithm and processor to control adjustment of the optical segments until an image pattern similar to the image pattern 800 in FIG. 8 is generated by the reflected light beam. The center 802 can be at a center of a detector, or at a predetermined reference point on the detector, to facilitate simultaneous alignment of multiple segments without potentially confusing overlap of optical energy in the detector plane.

Figure 8B:
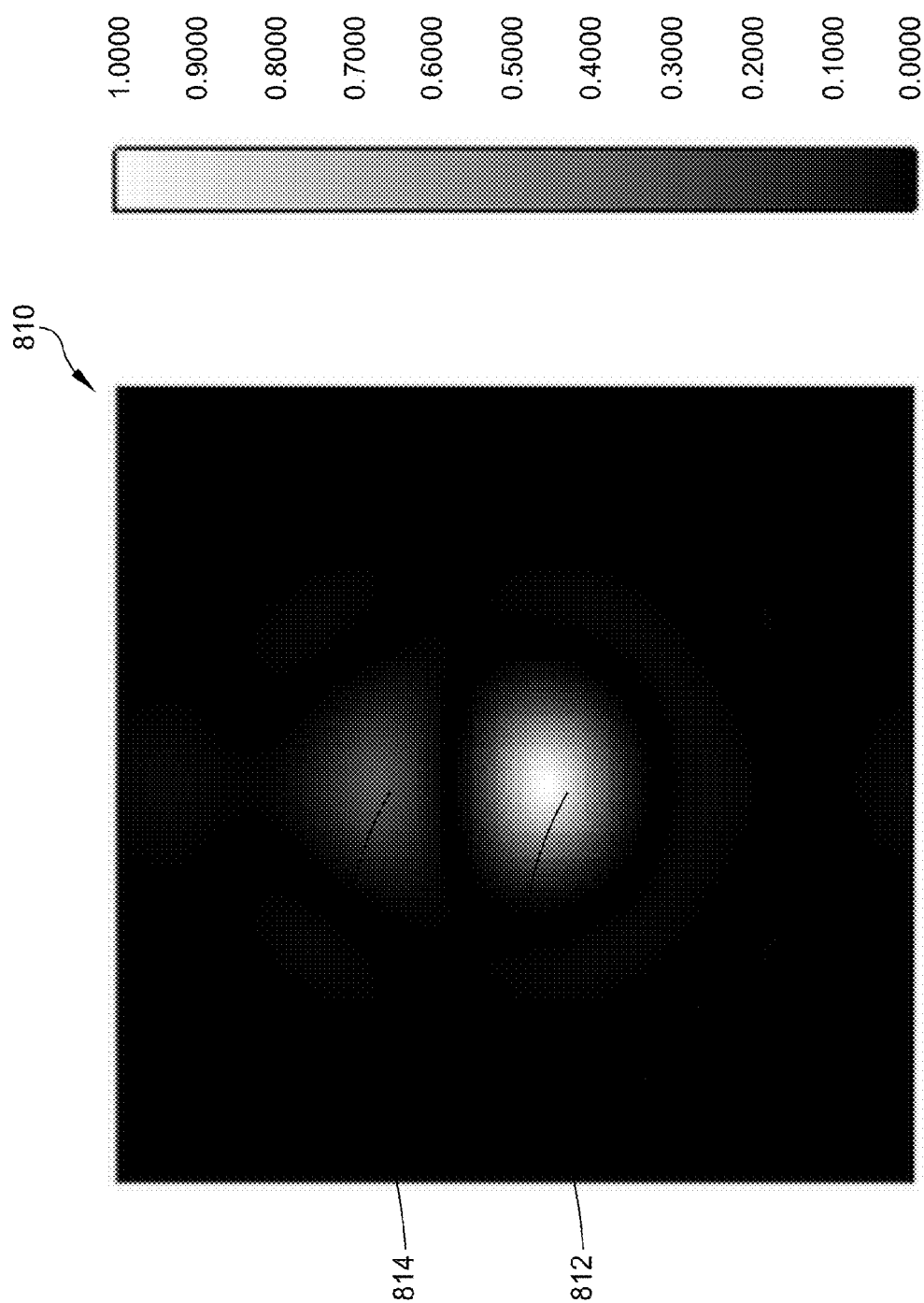

For example, FIG. 8B shows an example image pattern 810 generated by a light beam reflected by a second optical segment that is offset from a first optical segment by 0.0005 inches. A center 812 of the image pattern 810 can reflect the offset, compared to the image pattern 800 of properly aligned optical segments. Additionally or alternatively, the image pattern 810 can show a pattern without a clear center as a second center 814 can be detected in the image pattern 810, which is also indicative of some misalignment between the mirror segments.

Figure 8C:
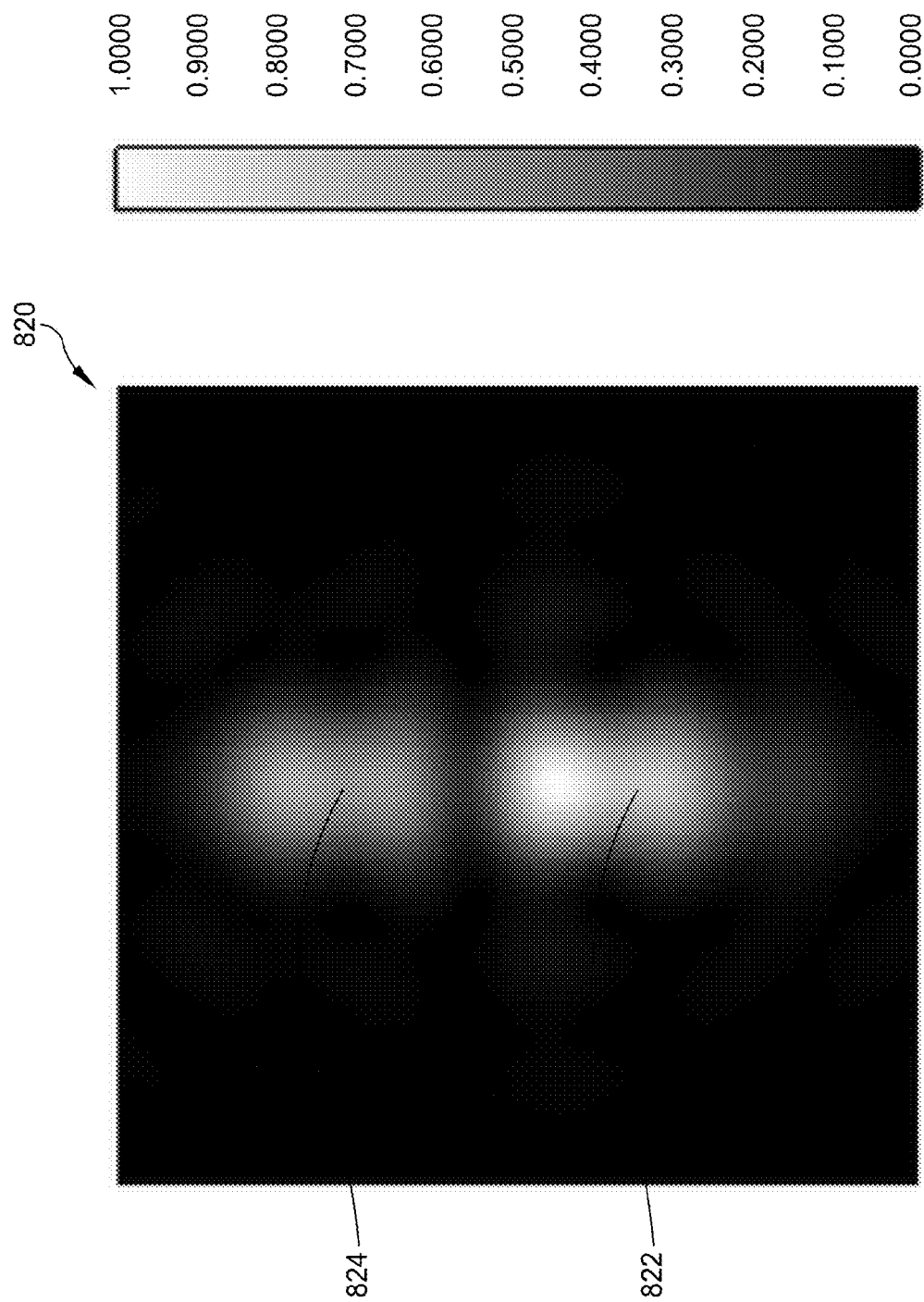
Figure 8D:
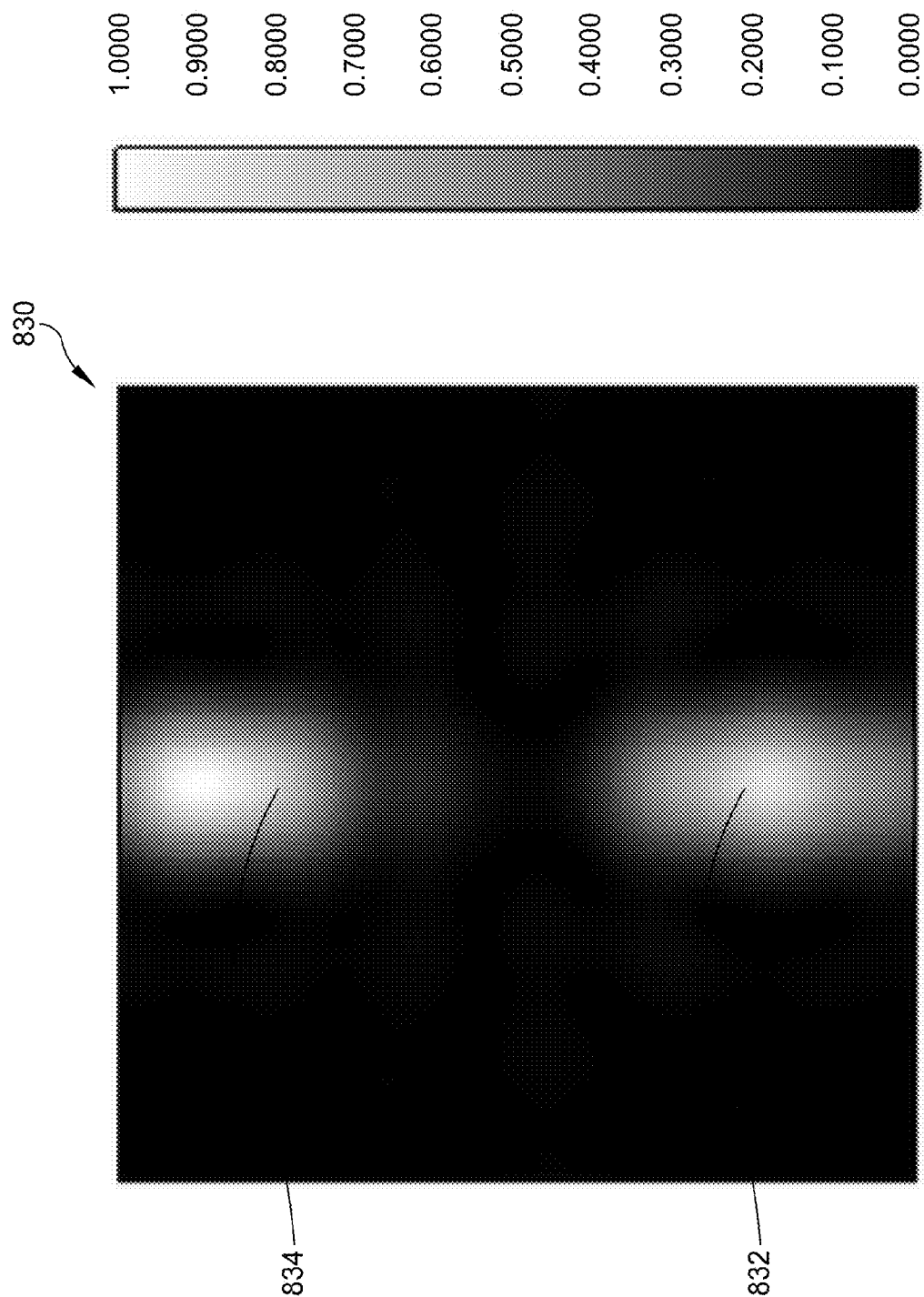

FIG. 8C shows another example image pattern 820. The image pattern 820 is generated by a light beam reflected by two optical segments that are offset by 0.0005 inches and 0.005 degrees. The image pattern 820 has even less of a clear center compared to that of the image pattern 810 generated by optical segments offset by 0.0005 inches. Two centers 822, 824 are further displaced and less clear than that of the image pattern 810. Such an image pattern can be use to determine, for example, that the mirror segments producing the image pattern of FIG. 8C are further out of alignment than the mirror segments positioned so as to produce the image pattern of FIG. 8B. FIG. 8D shows an example image pattern 830 with a greater offset, the optical segments being offset by 0.0005 inches and 0.01 degrees. The centers 832, 834 are further displaced and become separate spot images on the focal plane. Such an image pattern can be used to determine, for example, that the mirror segments producing the image pattern of FIG. 8D are even further out of alignment than the mirror segments positioned so as to produce the image pattern of FIG. 8C. This information can be used, for example, in an iterative process to determine that the mirror segments are being moved in so as to be further misaligned as opposed to further into alignment. Thus, in some embodiments, the interferometer procedure can generate similar image patterns which can be used to adjust the alignment of the two optical segments until the desired alignment is achieved.

The interferometer procedure can be repeated between each pair of adjacent optical segments, aligning each of the optical segments relative to each other. The alignment of the optical segments relative to the body of the optical device can be globally configured based on the location of the center of the image pattern relative to a reference location on the detector, or by assigning a child segment as a master location position. The active optical sources used for the interferometer can be configured on the optical device as described above with regard to the sub-aperture procedure. The interferometer procedure can use one or more active optical sources for each light beam directed at the optical segments.

In some embodiments, the sub-aperture procedure is used to configure the alignment of the optical segments. In some embodiments, the interferometer procedure is used to configure the alignment of the optical segments. In some embodiments, both procedures are used. For example, the interferometer procedure can be used to align each of the optical segments relative to each other. The sub-aperture procedure can then be used to align the optical segments relative to the body of the optical device and to the other optical elements in the optical device. As the optical segments are already aligned relative to each other, the sub-aperture procedure can be executed on one of the optical segments.

Figure 9:
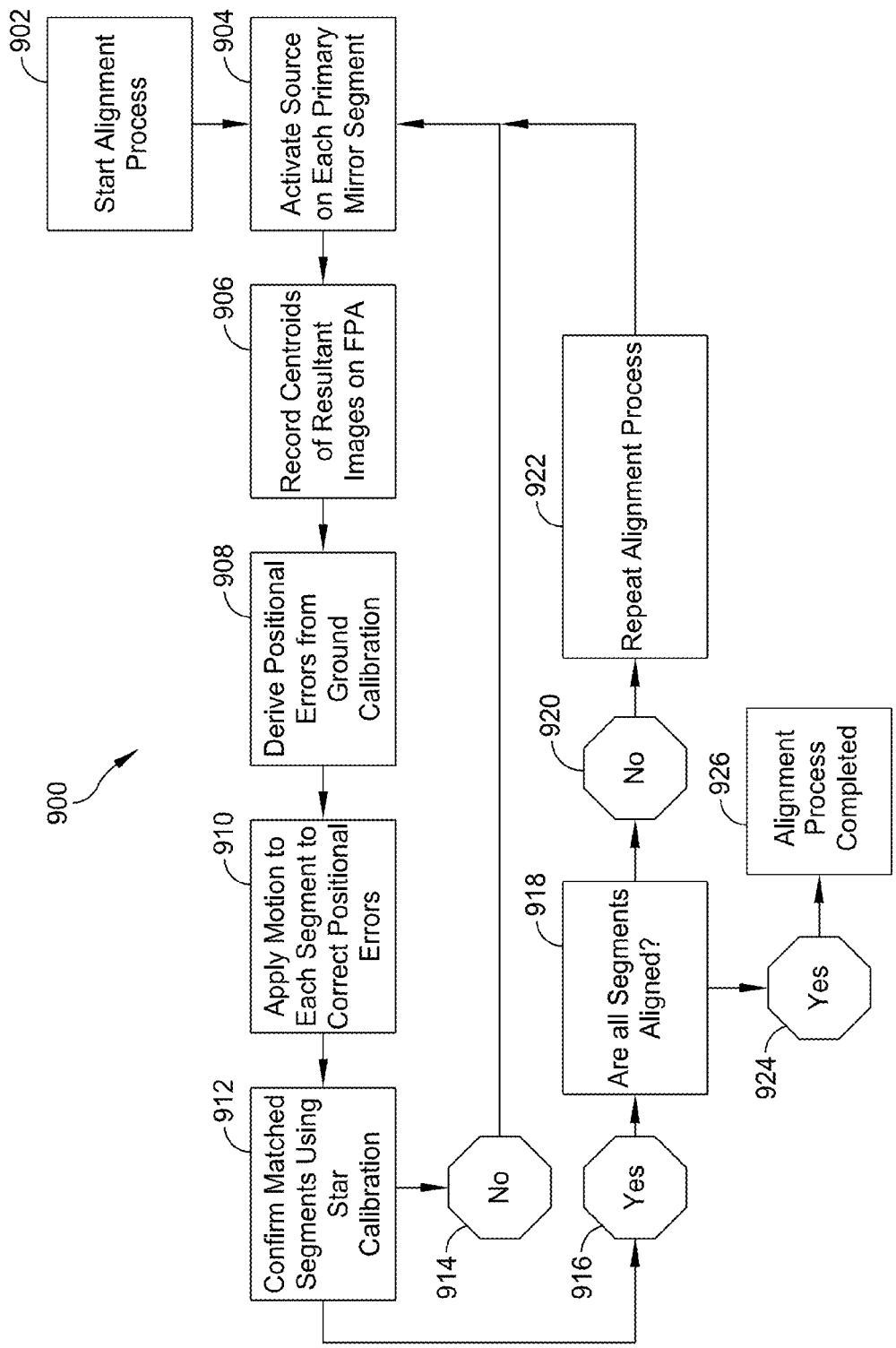
FIG. 9 is a flow chart of an example process of aligning an optical device.

FIG. 9 shows a flow chart of an example process 900 of the sub-aperture procedure. The alignment process 900 starts at 902. At 904, active optical sources are activated on each optical segment. The optical segments can be segments of a primary mirror. At 906, centroids of resultant images from the primary mirror segments are recorded on a detector. The detector can be a focal plane array (FPA) or any other detector known to those of skill in the art. At 908, the measurements are compared to prior reference measurements and positional errors are derived from differences between the current measurements and the previously recorded reference measurements. For example, the reference measurement can be centroids from a desired alignment measured during ground or lab calibration of the optical device. At 910, motion is applied to each mirror segment to correct the positional errors. The direction, axes, and/or amount of motion applied to the mirror segments can be determined from the derived differences between the current measurements and the previously recorded reference measurements. At 912, matched segments are confirmed using star calibration, such as measuring a Strehl ratio of the alignment and comparing the measured Strehl ratio to a predicted value. Alternatively or additionally, an optimum sharpness function can be used to determine whether the segments have been aligned as desired. If the segments have not been properly aligned (box 914), the procedure returns to activating the active optical sources on each primary mirror segment (box 904). If the alignment of the segments has been confirmed (box 916), all segments are checked for alignment at 918. If not all segments are aligned (box 920), the alignment process is repeated at 922. If all segments are aligned (box 924), the alignment process is completed at 926. It is to be appreciated that this process and the incident light source and alignment procedure can be done with any of a continuous light source, an intermittent light source, while measurements are being made with the overall device or in between measurements made with the overall device, or any combination thereof.

Figure 10:
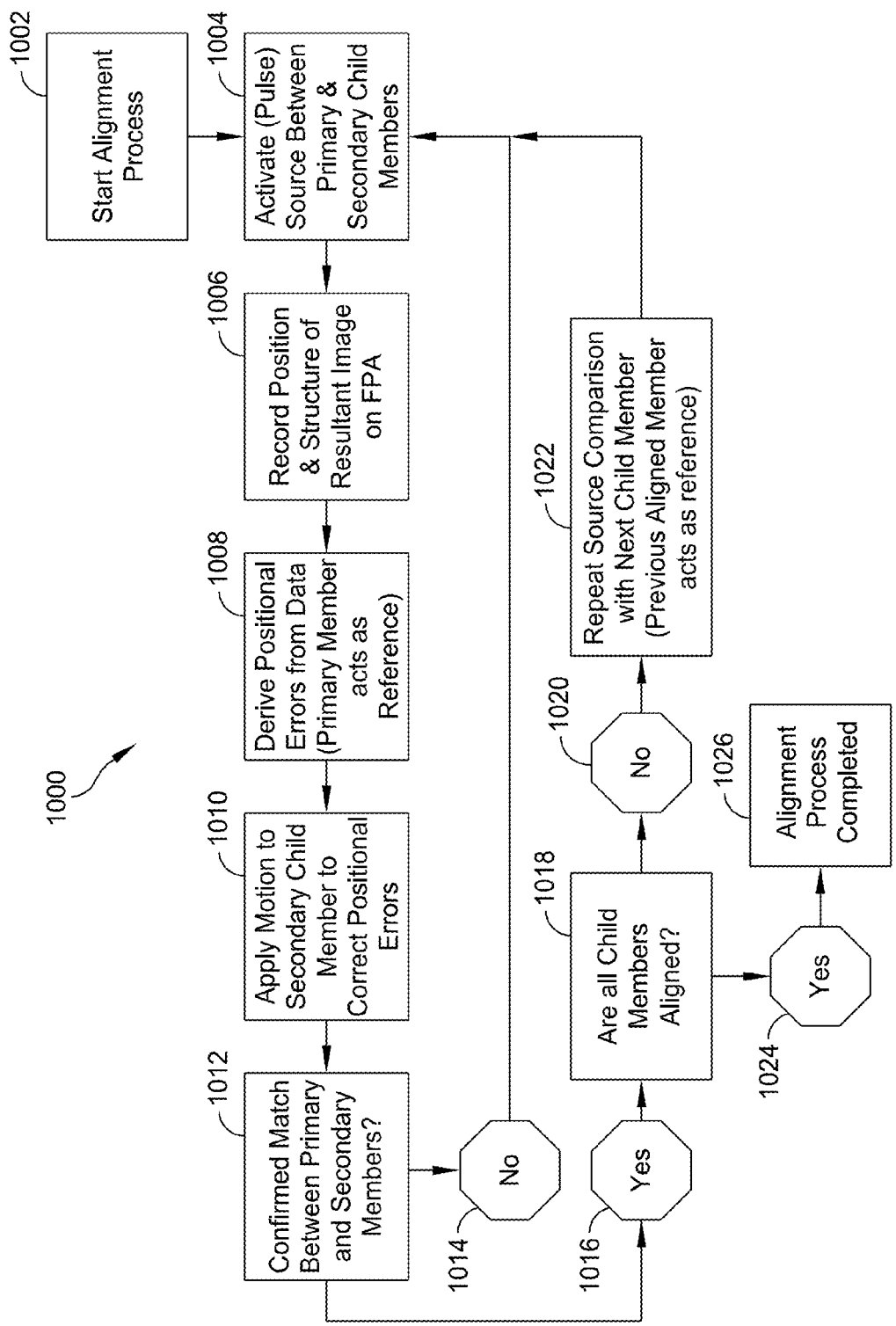
FIG. 10 is a flow chart of an example process of aligning an optical device according to embodiments of the present disclosure.

FIG. 10 shows a flow chart of an example process 1000 of the interferometer procedure. The alignment process 1000 starts at 1002. At 1004, active optical sources are activated between optical segments. The active optical sources can be pulsed between a first optical segment and a second optical segment. The first optical segment can be a primary child member used as a reference surface. The second optical segment can be a secondary child member used as a test surface. At 1006, a position and structure of a resultant image is recorded on a detector (e.g., FPA). At 1008, positional errors are derived from the position and structure of the recorded image. At 1010, motion is applied to the secondary child member to correct the derived positional errors. At 1012, the alignment between the primary and secondary child members is confirmed. If no alignment is confirmed (box 1014), the process returns to activating the optical sources (box 10014). If alignment is confirmed (box 1016), the alignment of all the child members is checked at 1018. If not all child members are aligned (box 1020), the process is repeated with the next child member at 1022. The secondary child member that has been aligned is then used as the primary child member for the next adjacent optical segment. If all the child members are aligned (box 1024), the alignment process is completed at 1026. It is to be appreciated that this process and the incident light source and alignment procedure can be done with any of a continuous light source, an intermittent light source, while measurements are being made with the overall device or in between measurements made with the overall device, or any combination thereof.

In some embodiments, the procedures described above can be altered by using a changing coherence length of the light provided by the light source. For example, an LED or laser source can be driven with varying currents or varying optical filters can be inserted to change the coherence length. The changing coherence length can be used to generate characteristics of reflections that can be measured to determine the alignment of the optical segments, and specifically vary the system sensitivity to the axial displacement of the two mirror surfaces, in order to facilitate rough versus fine alignment of the mirror axial positions.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A sparse optical system comprising:
    an optical element comprising a plurality of optical segments in a sparse aperture configuration;
    one or more active optical sources located on the sparse aperture optical system and configured to provide at least one beam of light directed at least one segment of the plurality of optical segments;
    a detector configured to receive a reflection of the at least one beam of light from at least one of the plurality of optical elements; and
    a processor configured to:
        determine a characteristic of the reflected light from at least one of the plurality of optical elements; and
        based on the characteristic of the reflected light, determine an alignment of one segment of the plurality of optical segments to another segment of the plurality of optical elements.

2. The system of claim 1, wherein the processor is further configured to:
    adjust a position of the at least one segment of the plurality of optical segments;

determine a change in the characteristic of the reflected light; and based on the change in the characteristic of the reflected light, determine whether the alignment of the at least one segment of the plurality of optical segments matches a predetermined alignment.

3. The system of claim 1, wherein the processor is further configured to repeat each of the steps for each of the plurality of optical segments.

4. The system of claim 1, wherein the optical element is a reflective optical element.

5. The system of claim 1, wherein the optical element is a refractive optical element.

6. The system of claim 1, wherein the at least one beam of light comprises a first beam of light directed at both a first optical segment and a second optical segment, the first and second optical segments being adjacent to each other.

7. The system of claim 6, wherein the characteristic of the reflected light includes interference patterns of the reflected light.

8. The system of claim 7, wherein the processor is configured to determine a position of a centroid of the interference patterns.

9. The system of claim 7, wherein the processor is configured to determine a focus of a centroid of the interference patterns.

10. The system of claim of 7, wherein the processor is further configured to:

adjust a position of the second optical segment;

determine a change in the interference patterns of the reflected light; and based on the change in the interference patterns of the reflected light, determine whether the alignment of the second optical segments matches a predetermined alignment;

provide a second and third beam of light from a second and third light source;

direct the second and third beam of light at a first and second point on one of the first or second optical segments;

detect reflections of the second and third beams of light;

determine characteristics of the reflected second and third beams of light; and based on the characteristics of the reflected second and third beams of light, determine whether the alignment of the first and second segments of the plurality of optical segments matches a predetermined alignment.

11. The system of claim 10, wherein the first and second light sources are the same light source.

12. The system of claim 1, wherein the one or more active optical sources comprises a light emitting diode.

13. The system of claim 1, wherein the one or more active optical sources comprises a laser.

14. The system of claim 1, wherein the one or more active optical sources comprises an active optical source located behind a second optical element.

15. The system of claim 1, wherein the one or more active optical sources comprises at least one active optical source embedded in at least one of the plurality of optical segments.

* * * * *